United States Patent
Bååth

(10) Patent No.: US 8,044,843 B2
(45) Date of Patent: Oct. 25, 2011

(54) METHOD AND DEVICE FOR CONTACTLESS LEVEL AND INTERFACE DETECTION

(75) Inventor: Lars Bååth, Eldsberga (SE)

(73) Assignee: Agellis Group AB (SE)

( * ) Notice: Subject to any disclaimer, the term of this patent is extended or adjusted under 35 U.S.C. 154(b) by 741 days.

(21) Appl. No.: 11/887,083

(22) PCT Filed: Mar. 24, 2006

(86) PCT No.: PCT/EP2006/061025
§ 371 (c)(1),
(2), (4) Date: Dec. 20, 2007

(87) PCT Pub. No.: WO2006/103200
PCT Pub. Date: Oct. 5, 2006

(65) Prior Publication Data
US 2009/0066966 A1    Mar. 12, 2009

Related U.S. Application Data

(60) Provisional application No. 60/594,402, filed on Apr. 5, 2005.

(30) Foreign Application Priority Data

Mar. 31, 2005  (EP) .................................... 05102564

(51) Int. Cl.
*G01S 13/08* (2006.01)
*G01F 23/284* (2006.01)
*G01S 13/00* (2006.01)
*G01F 23/00* (2006.01)

(52) U.S. Cl. ........ 342/124; 342/118; 342/127; 342/128; 342/175; 342/195; 73/290 R; 324/600; 324/629; 324/637; 324/642

(58) Field of Classification Search .................... 342/21, 342/22, 27, 28, 118, 123, 124, 175, 190–197, 342/59, 128–132; 73/290 R, 304 R, 304 C, 73/290 B, 290 V, 293; 324/600, 629, 637–646, 324/633, 636; 331/37
See application file for complete search history.

(56) References Cited

U.S. PATENT DOCUMENTS
2,766,422 A * 10/1956 Carbonetto .................... 342/22
(Continued)

FOREIGN PATENT DOCUMENTS
JP    8506849 A    7/1996
(Continued)

OTHER PUBLICATIONS
International Search Report for PCT Application No. PCT/EP2006/061025, (Jul. 17, 2006), 3 pgs.
(Continued)

*Primary Examiner* — Bernarr Gregory
(74) *Attorney, Agent, or Firm* — Schwegman, Lundberg & Woessner, P.A.

(57) ABSTRACT

Method and apparatus for determining the thickness of material layers of a container-held substance comprising a first material disposed in an upper layer and a second material disposed in a lower layer, by transmitting a radio signal through the substance towards a container portion; receiving reflected signals from a surface of the upper layer, a surface of the second layer, and the container portion; varying the frequency of the transmitted signal to determine phase displacement between transmitted and reflected signals; determining optical distances to the surfaces and the container portion, dependent on the phase displacements; determining the thickness of one of said layers dependent on phase displacement through and index of refraction of that layer; and determining the thickness of the other layer dependent on the thickness of said one of said layers.

18 Claims, 1 Drawing Sheet

U.S. PATENT DOCUMENTS

| | | | | |
|---|---|---|---|---|
| 2,912,643 | A * | 11/1959 | Rohrbaugh et al. | 324/639 |
| 2,958,829 | A * | 11/1960 | Hay | 331/37 |
| 3,122,720 | A * | 2/1964 | Morse | 342/22 |
| 3,323,044 | A * | 5/1967 | Parlanti et al. | 324/636 |
| 3,351,936 | A * | 11/1967 | Feder | 342/22 |
| 3,356,941 | A * | 12/1967 | Everman | 324/636 |
| 3,400,330 | A * | 9/1968 | Thompson, Jr. et al. | 324/636 |
| 3,601,695 | A * | 8/1971 | Heile | 324/636 |
| 3,629,698 | A * | 12/1971 | Lamb | 324/642 |
| 3,665,466 | A * | 5/1972 | Hibbard | 342/59 |
| 3,745,575 | A * | 7/1973 | Kikuchi | 342/22 |
| 3,826,978 | A * | 7/1974 | Kelly | 324/639 |
| 3,898,558 | A * | 8/1975 | Thompson, Jr. | 324/636 |
| 4,027,237 | A * | 5/1977 | Heile | 324/636 |
| 4,044,353 | A * | 8/1977 | Levy | 342/124 |
| 4,075,555 | A * | 2/1978 | Wight et al. | 324/644 |
| 4,245,191 | A * | 1/1981 | Schroeder | 342/22 |
| 5,012,248 | A * | 4/1991 | Munro et al. | 342/22 |
| 5,051,748 | A * | 9/1991 | Pichot et al. | 342/22 |
| 5,070,730 | A * | 12/1991 | Edvardsson | 73/290 V |
| 5,287,740 | A * | 2/1994 | Tomita | 342/22 |
| 5,327,139 | A * | 7/1994 | Johnson | 342/22 |
| 5,629,706 | A | 5/1997 | Bääth | |
| 5,767,679 | A * | 6/1998 | Schroder | 342/22 |
| 5,835,053 | A * | 11/1998 | Davis | 342/22 |
| 5,835,054 | A * | 11/1998 | Warhus et al. | 342/22 |
| 6,198,424 | B1 | 3/2001 | Diede et al. | |
| 6,422,073 | B1 | 7/2002 | Krahbichler et al. | |
| 6,445,192 | B1 * | 9/2002 | Lovegren et al. | 324/644 |
| 6,531,881 | B1 * | 3/2003 | Cordes et al. | 324/644 |
| 6,545,945 | B2 * | 4/2003 | Caulfield | 342/22 |
| 6,701,647 | B2 * | 3/2004 | Stump | 342/22 |
| 6,853,199 | B2 * | 2/2005 | Noik et al. | 324/637 |
| 2003/0117150 | A1 | 6/2003 | Noik et al. | |

FOREIGN PATENT DOCUMENTS

RU        2152595        7/2000

OTHER PUBLICATIONS

"PCT Application No. PCT/EP2006/061025, International Preliminary Report on Patentability / Written Opinion mailed Oct. 11, 2007", 8 pgs.

"Japanese Application Serial No. 2008-503487, Office Action dated Dec. 8, 2010", (English Translation), 3 pgs.

* cited by examiner

METHOD AND DEVICE FOR CONTACTLESS LEVEL AND INTERFACE DETECTION

RELATED APPLICATIONS

This application is a nationalization under 35 U.S.C. 371 of PCT/EP2006/061025, filed Mar. 24, 2006 and published as WO 2006/103200 A1 on Oct. 5, 2006, which claimed priority under 35 U.S.C. 119 to European Patent Application Ser. No. 05102564.1, filed Mar. 31, 2005 and U.S. Provisional Patent Application Ser. No. 60/594,402, filed Apr. 5, 2005; which applications and publication are incorporated herein by reference and made a part hereof.

FIELD OF THE INVENTION

The present invention relates to a method and an apparatus for measuring levels of a substance comprising two or more materials devised in a container, which materials are arranged in layers in the container. The method preferably includes measuring the positions of surfaces of the different layers using radio waves.

BACKGROUND

In certain circumstances a substance is stored in a container, in which container different materials of the substance are divided into different layers. If the substance comprises two liquid materials which do not mix, such as an oil-based material and a water-based material, the denser material will collect closer to the bottom of the container, and the less dense material will collect closer to the surface. Another example may be a substance comprising a first generally liquid material, into which solid particles of a second material are dispersed. If left to rest, the second material particles will subsequently gather either on top of or under the liquid first material, dependent on which material is denser.

In such conditions it may be of interest to measure the amount of the different materials in the container, or the levels of surface defining the material layers. One example of a situation where such a measurement is of interest is in a container of petroleum oil, which also contains a certain amount of water. This may be the case in a tank of a oil tanker ship, or in an oil cistern e.g. in a refinery. The water may be deliberately disposed in the container, or be present due to condensation. Nevertheless, once placed in the container, the oil and the water will separate, such that the oil is collected in an upper layer and the water in a lower layer. Since the amount of oils is generally considerable larger than the amount of water, a surface dividing the two layers will be disposed close to the bottom of the container, and the actual position of the dividing surface is not easily assessed.

Solutions for measuring the level of water in an oil tank have been provided in the prior art. A problem is that the level of water preferably should be determined with an accuracy of a few millimeters, even when the water layer is located under a layer of oil of up to 35 meters or more, the dielectric constant of which is not well known. It has therefore not been possible to provide a contact free method for determining the level of the water with reasonable accuracy through the oil. Prior art solutions have consequently made use of alternative solutions, such as capacitive sensors applied in a narrow tube extending from the bottom of the container to the top.

SUMMARY OF THE INVENTION

In many situations where materials are divided into layers in a container, such as in the example of oil tanks, a contact free analysis method is preferable. The reason for this may be that the substance as such is hazardous, reactive to contact detector devices, or simply provides unnecessary wear to the detector device used, or that the substance itself may be contaminated by contact from probes or other devices. Furthermore, contact free sensors are generally easier to access for maintenance or repair purposes.

It is therefore an object of the invention to provide a contact free method for analysing a substance disposed in a container, which substance comprises two or more different materials arranged in layers.

According to the invention, this object is fulfilled by means of a method and an apparatus as recited in the appended claims.

BRIEF DESCRIPTION OF THE DRAWINGS

Preferred embodiments of the invention will be described in more detail with reference to the appended drawings, on which FIG. 1 schematically illustrates a system setup for performing a method in accordance with an embodiment of the invention for determining positions of levels for material layers of a substance in a container.

DETAILED DESCRIPTION OF PREFERRED EMBODIMENTS

Figure 1:
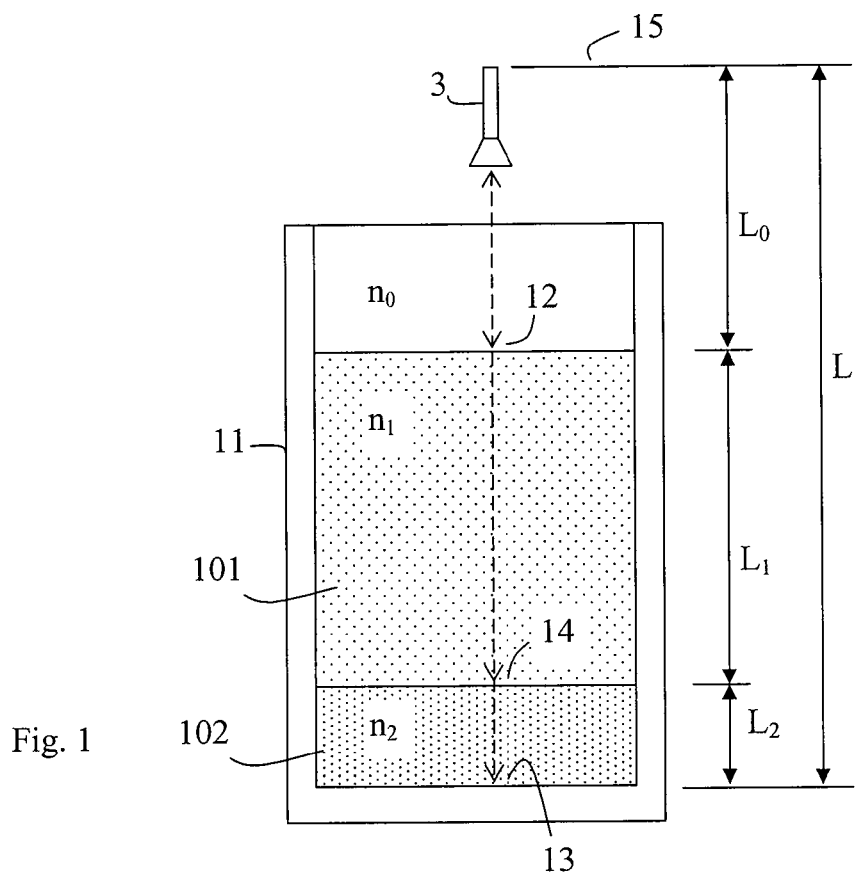

Changes in the pattern of electromagnetic wave fronts represent the most sensitive probes in physics. Electromagnetic waves may penetrate media of varying physical properties, changing its amplitude and phase in a way which is specific to the content of the media. Thus, continuum radiation will be affected when penetrating a media in the sense that the amplitude will be attenuated and the propagation velocity will change, resulting in a sudden change of phase in the interface surface. The radio band is of particular interest in that here waves can penetrate deeper into dusty areas and penetrate through materials which are opaque to visual light.

U.S. Pat. No. 5,629,706, issued to the inventor of the present invention, discloses a method for measuring the position of a metallurgical melt surface in a furnace or the like, where a metal portion of the melt is covered by a slag layer. The method includes providing a signal generator for generating signals at a plurality of frequencies over a frequency band, and providing an antenna for receiving the signals generated by the signal generator and for transmitting radio waves at the plurality of frequencies over the frequency band. The antenna is disposed adjacent the metallurgical melt, transmitting the radio waves from the antenna toward the metallurgical melt, at the plurality of frequencies over the frequency band. The transmitted radio waves are reflected in the upper surface of the slag layer and in the surface of the metal portion. The antenna thus receives reflected images of the transmitted radio waves from those surfaces, and means are provided for determining a phase displacement between the transmitted radio waves and the received reflected images of the transmitted radio waves, transforming the determined phase displacement from a frequency to a time plane, and determining from the time plane transform a position of the metal portion and the slag layer. This way, a measurement of the amount of metal present in the furnace can be obtained. However, the radiation does not penetrate the metal melt.

Contrary to the afore-mentioned U.S. patent, the present invention relates to a method for analysing a substance in a container, which substance comprises two or more materials which are transparent to microwave radiation, and wherein a microwave radiation signal can propagate through the substance and be reflected towards a container portion, typically the bottom of the container.

The time-delay of a wave signal relative another wave signal is in the Fourier-, or frequency space a linear shift of phase with frequency. If a signal is transmitted towards and reflected in a surface, the relative phase of the transmitted and received signals therefore will change linearly with frequency. If the signal is measured in steps over a frequency band, then a plot of phase with frequency would be a line with a slope corresponding to the delay of the reflecting signal compared to the reference signal. The optical distance can thus be measured via such a frequency stepped system, and also the geometrical distance provided the index of refraction of the first medium is known, typically air. If the signal is instead transmitted towards a semitransparent medium, then part of the signal will be reflected, and part of the signal will propagate through the medium to be reflected in the next surface or surfaces where the index of refraction again is changing. These doubly or more reflected waves will, when complex multiplied with the conjugate of the reference signal, i.e. the transmitted signal, show a more complicated curve of phase as a function of frequency. If data therefore are sampled as complex amplitudes in frequency channels over a frequency band, then the optical distances to all surfaces in which reflection occurs can be recovered. If then the signal is transmitted and received by an interferometer in the aperture plane, then the full three-dimensional structure of the two surfaces can be reconstructed.

The present invention is based on the inventor's realisation that the fundamental idea behind his afore-mentioned patent can be used for different substances than metallurgic melts, and typically for substances comprising two or more materials, which are transparent to microwave radiation and arranged in layers in the container. Furthermore, the presently described invention makes use of the transparency of the substance by involving a reflected signal propagated through the substance to and from a container portion, typically an inner bottom wall portion of the container. The reflecting container portion may however also be a specifically arranged surface disposed in the container for this purpose, which does not necessarily have to be disposed at the bottom of the container. The invention involves knowing, however, the actual geometrical distance to the container portion, and that the container portion is placed behind a first layer of a first material, and behind or in a second layer of a second material, as seen from the antenna. A preferred embodiment of the invention makes use of a system similar to that of U.S. Pat. No. 5,629,706. However, the system is used in a different way.

Figure 2:
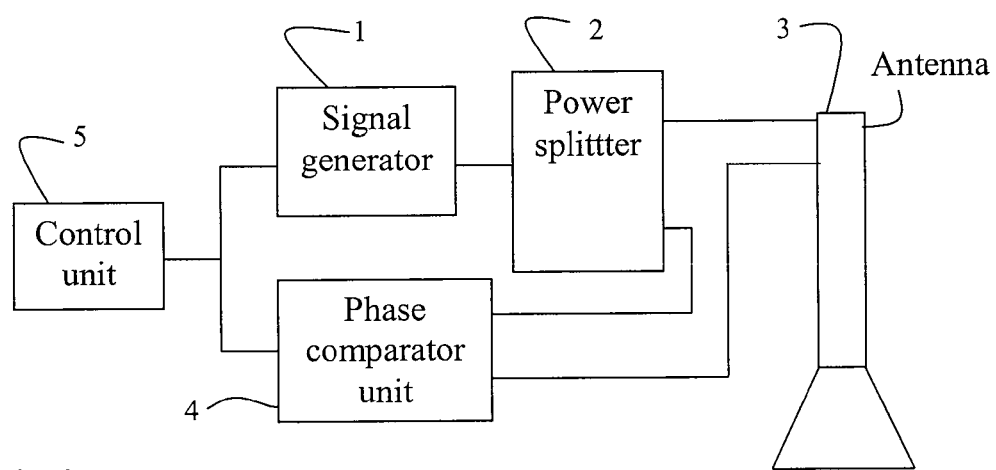
FIG. 2 schematically illustrates an embodiment of an apparatus for use in a system or method in accordance with an embodiment of the invention for analysing a substance in a container.

An apparatus for use in an embodiment of the invention is illustrated in FIG. 2. A signal is created at a defined frequency with a signal generator 1. This signal is transferred via a cable to a power splitter 2 where one path is conveyed via a cable to an antenna 3. The second path is conveyed via a cable to a phase comparator unit 4 where it is used as reference signal. The antenna is devised to transmit an electromagnetic signal, e.g. in the form of a circularly polarized radio wave, towards an object surface (not shown in FIG. 2). When the transmitted signal hits the object surface it is at least partly reflected, and the reflected signal is received by the same antenna 3. For a circularly polarized wave the reflected signal is received in the opposite circular polarisation due to the odd number of reflections. The received signal is transmitted through a cable to the phase comparator 4 and there complex multiplied with the conjugate of time reference signal. The phase and possibly also the amplitude of the complex conjugate multiplication is stored in a table by a control unit 5, typically a computer, and the signal generator is stepped in frequency and a new measurement is taken. This procedure continues until a certain number of frequency channels have been measured separately over a frequency band. The equipment is computer-controlled, e.g. by control unit 5, which also stores the data and performs signal analysis. Control unit 5 consequently typically includes a computer system comprising a data processor, memory means, and computer program code, which when executed by the data processor adapts the control unit to perform the steps described in this description, i.e. for example to vary the frequency of the transmitted signal in steps, to perform Fourier transform analysis of combined transmitted and received signals, and to make calculations to determine geographical distances and indexes of refraction.

FIG. 1 shows a system setup for measuring material layer levels in a substance including a first material disposed in a first, upper, layer 101 and a second material disposed in a second, lower, layer 102, devised in a container 11, according to an embodiment of the invention. The materials of layers 101 and 102 are such that they do not mix unless actively agitated or otherwise affected. Hence, the first and second material may be different in their composition such that they do not mix, where the first material is oil-based and the second material is water-based. Another possible scenario is that one of the first and second materials is particulate and the other material is liquid, wherein either particles of the first material floats to the surface of the liquid second material, or particles of the second material sinks to the bottom of the liquid first material, dependent on the density relationship. Yet another possibility is that both the first and the second materials are particulate materials or powders, which are placed in the container 11 in a certain order to define layers 101 and 102.

The antenna 3 is illustrated, although the remaining parts of the apparatus of FIG. 2 are not illustrated in FIG. 1. The object of the setup of FIG. 1 is to obtain the level position of surface portion 14, which also makes it possible to determine the relative and absolute amounts of the first and second material in the substance. For this purpose, antenna 3 is placed adjacent to an upper surface 12 of the substance, and preferably aimed perpendicularly to surface portion 12. The medium present between antenna 3 and surface portion 12 is typically air, but may be polluted or of a different gas composition, and has an index of refraction $n_0$. This index is typically very close to 1, and for the following description it is approximated that $n_0=1$. Consequently, the signal propagation speed between antenna 3 and surface portion 12 is approximated to be c, the speed of light.

When a radio signal transmitted from antenna 3 hits surface portion 12 it is partly reflected back towards antenna 3, where it is received. The received signal is transmitted through a cable to the phase comparator 4 for further processing together with the transmitted signal according to the above. A portion of the transmitted signal propagates through layer 101, and is partly reflected back towards antenna 3 from surface portion 14, where layers 101 and 102 are divided. Since layer 102 is also transparent to the radiation of the transmitted signal, a portion of the radiation hitting surface portion 14 will continue through second layer 102. The reflectance in surface portion 14 is proportional to $(n_2-n_1)/(n_1+n_2)$ in intensity.

In accordance with the invention, antenna 3 is placed at a predetermined geometrical distance L from, and preferably perpendicularly aimed towards, an object fixed in relation to the container 11, wherein the line of sight from antenna 3 to the object passes through surface portion 12. This object may be a reference plate disposed in the interior of the container. In the embodiment of FIG. 1, however, the object is a bottom wall portion 13 of container 11, hereinafter denoted container portion 13. The transmitted signal will therefore partly pass through layers 101 and 102 to reflect in container portion 13 back to antenna 3.

The reference wave received at time $t_0$ and at frequency $\omega$ may be written as:

$$U_{ref}(\omega)=e^{j\omega t_0}$$

The upper surface of substance 10, of which surface portion 12 forms a part, is positioned a geometrical distance $L_0$ from antenna 3. $L_0$ may be known, but in a typical embodiment according to FIG. 1 it is not. In particular, the upper surface of substance 10 may be uneven, especially if substance 10 is a powder or particulate matter, and the actual position of surface portion 12 may therefore not be known even if a general surface position can be determined. The signal reflected from surface portion 12, being a first surface of reflection, and referred to the same receiving time $t_o$, can be written as:

$$U_{S1}(\omega)=e^{j\omega(t_0-2L_0/c)}$$

The signal propagating through first layer 101 of the substance will pass twice through the layer 101 with a geometrical distance of $2L_1$, before and after reflecting against second surface portion 14. The signal received after reflection at surface portion 14, referred to the same receiving time $t_o$, can be written as:

$$U_{S2}(\omega)=e^{j\omega(t_0-2L_0/c-2L_1/v)}$$

Here, the propagation speed $v_1=c/n_1$, where $n_1$ is the index of refraction for the material of first layer 101.

The signal propagating through surface portion 14 and second layer 102 of the substance will travel another geometrical distance of $2L_2$, before and after reflecting against container portion 13. The signal received after reflection at container portion 13, being the third surface of reflection, and referred to the same receiving time $t_o$, can be written as:

$$U_{S3}(\omega)=e^{j\omega(t_0-2L_0/c-2L_1/v_1-2L_2/v_2)}$$

Here, the propagation speed $v_2=c/n_2$, where $n_2$ is the index of refraction for the material of second layer 102. The indexes of refraction may be frequency-dependent, something which can be accounted for by assessing the frequency dependence in the formulae used.

Distances L and L0 are measured from a reference position in the antenna represented as a level 14. The complex conjugate multiplication, where $U^*$ is the conjugate of U, or cross correlation in the time domain, of the reflected and reference signals is then:

$$S_{corr}(\omega)=U^*_{ref}(\omega)\cdot U_{S1}(\omega)+U^*_{ref}(\omega)\cdot U_{S2}(\omega)+U^*_{ref}(\omega)\cdot U_{S3}(\omega)$$

or, if the frequency is restricted to a pass band $Bpass(\omega_l,\omega_h)$, where $\omega_l$ is the lowest angular frequency and $\omega_h$ is the highest angular frequency of the pass band:

$$S_{corr}(\omega)=Bpass(\omega_l,\omega_h)e^{-j\omega 2L_0/c}+Bpass(\omega_l,\omega_h)e^{-j\omega 2L_0/c+2L_1n_1/c+2L_2n_2/c)}$$

The inverse Fourier-transform will transform from the frequency to the time-plane (delay or distance-plane). $Bpass(\omega_l,\omega_h)$ can be approximated with $Rect(\omega_l,\omega_h)$.

$$F^{-1}S_{corr}(Dt)=\text{sinc}(Dt=2L_0/c)+\text{sinc}(Dt-2L_0/c-2L_1n_1/c-2L_2n_2/c)$$

The time-delay response of the system is usually called the Point Spread Function in optics, and is in this case the Fourier transform of the frequency pass band. This response is measured by studying the response of a metal reflector at a known distance. The distances to the surfaces are then reconstructed from the observed signal by deconvolving with the measured Point Spread Function. The distance can then be referred to a specified reference level, $DL_{ref}$, through a translation of the time co-ordinate: $Dt=Dt-2DL_{ref}/c$. The reference level may be a previously measured metal reflector in the signal path, the edge of the metal container, or e.g. container portion 13 when no substance is present in container 11. The transform contains the structure in the depth-direction. If the data are also sampled in the aperture plane by using an interferometer as transmitter and receiver antennas then a further two dimensional transform over the aperture-plane will show the structure over the remaining two dimensions.

According to the embodiment of FIG. 1, an antenna 3 is devised to transmit a coherent radio signal towards surface portion 12, through surface portion 14, and further towards container portion 13. Antenna 3 will then receive three reflected radio signals from the reflecting surfaces of surface portions 12 and 14, and container portion 13, respectively. In accordance with the above, the relative phase of the transmitted and received signals will change linearly with frequency. The frequency of the transmitted signal, and thus also the received signals, is therefore varied in steps over a frequency band and the phase displacement of the received signals compared to the transmitted signal are measured for each step. By determining how the phase displacement varies dependent on frequency variation, the delays of the reflected signals compared to the transmitted signal are determined. In time, each frequency step should be maintained at least as long as the propagation time from transmitter to receiver, i.e. at least about twice the distance between transmitter and the farthest reflecting target. as an example, transmission of a coherent wave through 1 μs produces a transmitted signal of about 300 m, which is usable for measuring at distances up to about 150 m. The transmission time may of course also be longer in each step, such as 1 ms, but shorter steps will provide a faster process.

At this point, the geometrical distance L from antenna 3 to container portion 13 is known by being predetermined, the geometrical distance $L_0$ is known by calculation from the measured time delay of the reflected signal from surface portion 12 and the known or assessed index of refraction $n_0$, the optical distance $n_1L_1$ is known by calculation from the measured time delay of the reflected signal from surface portion 14, and the optical distance $n_2L_2$ is known by calculation from the measured time delay of the reflected signal from container portion 13. If the index of refraction $n_1$ for the material of layer 101 is known, then also the geometrical distance $L_1$ can be calculated. Furthermore, since the geometrical distance $L_1+L_2$ is known by being the difference between L and $L_0$, the geometrical distance $L_2$ can also be calculated even if the index of refraction $n_2$ of the material of second layer 102 is not known. In the same manner, the position of surface portion 14, i.e. where layer 101 borders to layer 102, can be determined also if the index of refraction $n_2$ of the material of second layer 102 is known, but not the index of refraction $n_1$ for the material of the first layer 101. This way, the invention is particularly useful if the index of refraction is more certain for one of the materials of layers 101 and 102 than the other, in that it is possible to select which index to use. This is advantageous e.g. when one of the materials is a pollutant or an unclean product, which may contain an unknown element of dirt or substances which affect the index of refraction. For the example of a substance including oil and water in e.g. an oil tanker, the composition of the oil may be fairly well known, whereas the refraction properties of the water is dependent on its level of purity. From one aspect, though, it may be advantageous to use a known or assessed value of the index of refraction for the least thick layer, which would be second layer 102 in FIG. 1. The reason for this is that the geometrical distance is directly proportional to the index of refraction and the travel time through the medium. Therefore, a thicker layer with a certain accuracy in the index of refraction will give a larger geometrical error than a less thick layer with the same accuracy in the index of refraction.

According to an aspect of the invention, a special procedure may be employed for determining the index of refraction for the material of a layer in the substance.

In a first step, the geometrical distance to a surface over the layer of the materials in question, and the optical distance through that layer, is determined, in the manner described above. For instance, distance $L_0$ is determined by the phase change in the reflected signal from surface portion 12 and the index of refraction $n_0$, and the optical distance $n_1 L_1$ through layer 101 is determined by the phase change in the reflected signal from surface portion 14.

Thereafter, an amount of the material of that layer only, layer 101 in the example, is added to the container.

The procedure of the first step is then repeated, i.e. the geometrical distance $L_0$ to surface portion 12 and the optical distance $n_1 L_1$ through layer 101 is determined again. Since matter of the material of layer 101 was added, both $L_0$ and $n_1 L_1$ has changed.

In the next step, the difference in $L_0$ between the repeated steps is calculated, representing the added thickness $\Delta L_1$ of layer 101, and the added optical distance through that layer is calculated from the difference in the phase displacement between the repeated steps.

Finally, the index of refraction of the material of that layer is determined, by calculating the ratio between added optical thickness through the layer and the added thickness of the layer.

This way, the index of refraction of one of the materials in the substance may be determined. If only two materials, and thus two layers 101 and 102, are present in container 11, this procedure may be used to determine the index of refraction for one of the materials, whereas the index of refraction of the other material is redundant. This may be particularly useful if there is no reliable estimate of the index of refraction for any of the two materials, or only for the material of a layer which is substantially thicker than the other layer.

Furthermore, if there are more than two layers of different materials, one parameter for each added layer must be known, either its thickness or its index of refraction, i.e. the optical thickness. Accordingly, if it is possible to add an amount of only the further material of a third layer, it is also possible to calculate the index of refraction for the material of that layer according to the procedure above. After that, the geometrical position of all dividing surfaces between the material layers and the top surface of the substance may be determined according to the method described herein. As the skilled person realises, the same goes for any number of layers.

The previous patent was targeted to slag thickness measurement, and required knowledge of the index of refraction of the slag material, and did not involve measurements of signals reflecting through two or more surfaces from a container portion. Even though the present invention works differently, it may be realised using a similar arrangement. The example of included components given in the working example described in U.S. Pat. No. 5,629,706 is therefore incorporated herein by reference, as an example of an embodiment for carrying out the method of the present invention. Referring to that example, and FIG. 1, the two output signals from the right side of power divider 2 are connected to a first port of the antenna 3 transmitting a signal, preferably of left hand circular polarisation, with a heliax cable (Andrew FSJ4-50B), and to receiver 4 with a steel coaxial cable. The other radio frequency port on the right side of receiver 4 is connected to a second port of the antenna 3 via a heliax coaxial cable (Andrew FSJ4-50B), preferably receiving the signal in the opposite, right hand circular polarisation. A data acquisition system 5 is connected to signal generator 1 and power divider 2 via GPIB bus cables. The data acquisition system 5, preferably a Vector Network Analyser, may in this embodiment be set to step in 501 frequency steps between 10 and 15 GHz, which constitutes the frequency band of use, and the complex division of the received signal and the reference signal from the transmitter is stored for each frequency channel. A total integration time of 1 second may be used for each data sampling. The complex data is preferably stored on computer discs and each spectrum and then analyzed off line with a special computer program based on the equations given above, for determining the index of refraction $n_1$.

The working example described in U.S. Pat. No. 5,629,706 was conducted employing microwave frequencies in the 10 to 14 GHz range. This is also a usable frequency band for the present invention. However, it should be noted that the actual range of the frequency band used has to be balanced dependent on the materials of layers 101 and 102 in question. In one aspect, the accuracy of the distance measurement increases with increasing frequency of the radio wave signal. For some cases the afore-mentioned frequency range may not work, though, since the absorption in the substance will be too high. This may be the case e.g. if one of the materials comprises a highly absorbing material, and also if the total depth of the substance is large. An example thereof is an oil tank, which as mentioned may contain up to 35 m of oil and water, with an attenuation of 1000-5000 dB at about 10 GHz. A lower frequency range will then have to be employed, e.g. in the range of 1-5 GHz, even if the accuracy of the method is thereby reduced. The attenuation due to absorption would the theoretically drop to 100-500 dB.

As already described, the present invention is adapted for determination of the level of one or more surfaces of different material layers 101, 102 of a substance held in a container 11. A typical application of the inventive method is where the substance in container 11 includes a first oil-based material, and a second water-based material. Container 11 may be a tank of an oil tanker ship or a stationary oil tank.

The invention has been described in detail by reference to preferred embodiments, but is not to be taken as limited to all of the provided details thereof, since modifications and variations thereof may be made without departing from the scope of the invention, as defined by the appended claims.

The invention claimed is:

1. A method for determining the thickness of a material layer of a substance held in a container, which substance includes a first material disposed in an upper layer and a second material disposed in a lower layer, the method comprising:

transmitting a radio signal, from antenna means placed at a predetermined distance from a container portion, through the substance towards the container portion;

receiving, in said antenna means, reflected signals from an upper first surface portion of the upper layer, from an upper second surface portion of the second layer, and from the container portion;

varying the frequency of the transmitted signal over a frequency band to determine phase displacement between the transmitted signal and the reflected signals;

determining optical distances from the antenna means to the first and second surface portions and to the container portion, dependent on the phase displacements;

determining the thickness of one of said layers dependent on the phase displacement through and index of refraction of that layer; and determining the thickness of the other of said layers dependent on said predetermined distance and the thickness of said one of said layers.

2. The method as recited in claim 1, wherein said one of said layers is the lower layer.

3. The method as recited in claim 1, wherein said one of said layers is the upper layer.

4. The method as recited in claim 1, wherein the first material is an oil-based liquid and the second material is a water-based liquid.

5. The method as recited in claim 1, wherein said container is an oil container of an oil tanker ship.

6. The method as recited in claim 1, wherein said container is a land-based oil cistern.

7. The method as recited in claim 1, wherein one of said materials is a liquid and the other of said materials is particulate.

8. The method as recited in claim 1, further including:
determining the geometrical distance to a surface over the layer of one of said materials, and the optical distance through that layer;
adding an amount of the material of that layer to the substance;
determining again the geometrical distance to said surface over that layer, and the optical distance through that layer;
calculating the added thickness of that layer, and the added optical distance through that layer; and
determining the index of refraction of the material of that layer dependent on the added thickness and the added optical distance through that layer.

9. The method as recited in claim 8, wherein said surface over the layer of one of said materials is the top surface of the substance.

10. The method as recited in claim 1, further including:
determining the geometrical distance to a surface in said substance;
adding an amount of a third material to a third layer, disposed over that surface;
determining again the geometrical distance to said surface over that layer, and the optical distance through the third layer;
calculating the thickness of the third layer; and
determining the index of refraction of the third material dependent on the thickness and the optical distance through the third layer.

11. The method as recited in claim 1, wherein the antenna means are aimed to direct radio signal waves substantially vertically downwards, wherein the container portion is a inner bottom wall portion.

12. The method as recited in claim 1, further including:
multiplying the first reflected signal with the transmitted signal in the frequency domain to determine the first phase displacement; and
transforming the first phase displacement to the time domain for determining the optical distance from the surface portion to the container portion.

13. The method as recited in claim 1, further including:
providing signal generation means for generating signals at a plurality of frequencies over a frequency band; and
connecting the antenna means to the signal generating means for receiving said signals generated by said signal generation means and for transmitting radio waves at said plurality of frequencies over said frequency band.

14. The method as recited in claim 1, wherein determining a first phase displacement between the transmitted signal and the first reflected signal includes cross correlating the transmitted signal and the received reflected signal.

15. The method as recited in claim 1, wherein said antenna means comprises an interferometer.

16. The method as recited in claim 1, wherein varying the frequency of the transmitted signal includes transmitting said signal at sequential frequencies of said plurality of frequencies.

17. An apparatus for determining the thickness of a material layer of a substance held in a container, which substance includes a first material disposed in an upper layer and a second material disposed in a lower layer, the apparatus comprising:
antenna placed at a predetermined distance from a container portion and aimed through the substance towards the container portion;
a comparator unit adapted to compare a signal transmitted through the antenna and reflected signals from an upper first surface portion of the upper layer, from an upper second surface portion of the second layer, and from the container portion; and
a control unit adapted to vary the frequency of the transmitted signal over a frequency band to determine phase displacement between the transmitted signal and the reflected signals, the control unit including a calculator adapted to determine optical distances from the antenna to the first and second surface portions and to the container portion, dependent on the phase displacements, determine the thickness of one of said layers dependent on the phase displacement through and index of refraction of that layer, and determine the thickness of the other of said layers dependent on said predetermined distance and the thickness of said one of said layers.

18. The apparatus as recited in claim 17, further including a signal generator, devised to generate an electromagnetic signal to the antenna, a signal power splitter connected between the generator and the antenna, and wherein the comparator unit is connected to the antenna and the signal power splitter.

* * * * *